No. 880,287. PATENTED FEB. 25, 1908.
L. W. FARRIS.
GARMENT STAY AND FASTENER.
APPLICATION FILED JUNE 25, 1907.
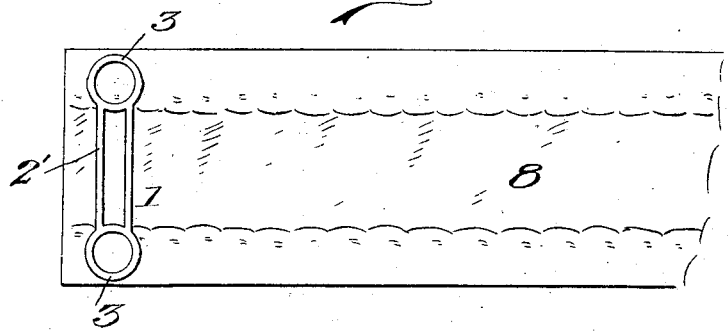
Fig. 1.
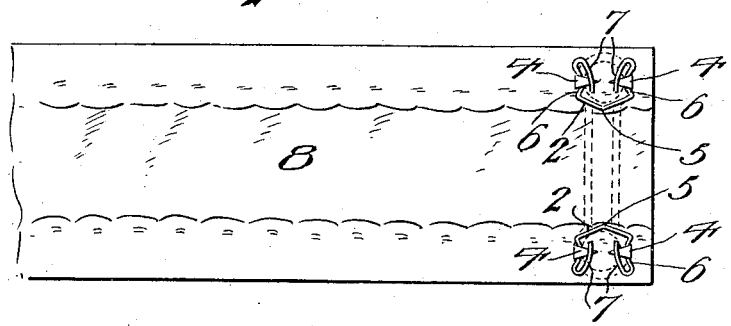
Fig. 2.
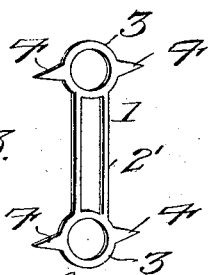
Fig. 3.
Fig. 4.
Witnesses
Inventor
Lucy W. Farris,
By Victor J. Evans
Attorney

UNITED STATES PATENT OFFICE.

LUCY W. FARRIS, OF KANSAS CITY, MISSOURI.

GARMENT STAY AND FASTENER.

No. 880,287.　　　Specification of Letters Patent.　　　Patented Feb. 25, 1908.

Application filed June 25, 1907. Serial No. 380,691.

*To all whom it may concern:*

Be it known that I, LUCY W. FARRIS, a citizen of the United States, residing at Kansas City, in the county of Jackson and State of Missouri, have invented new and useful Improvements in Garment Stays and Fasteners, of which the following is a specification.

This invention relates to a stay and fastener for garments and dress goods, the object of the invention being to provide a device of this character adapted for spreading and holding in shape collars, ribbons, belts, and other similar articles, and for fastening the meeting ends of belts and collars and other analogous purposes.

A further object of the invention is to provide a combined stay and fastener which is simple in construction, efficient in use, inexpensive of production and serves in addition as a dress ornament.

The invention consists of the features of construction, combination and arrangement of parts hereinafter fully described and claimed, reference being had to the accompanying drawing, in which:—

Figure 1 is a view of one side of a portion of a collar with the invention applied thereto. Fig. 2 is a view of the reverse side thereof. Fig. 3 is a perspective view of the stay member of the device. Fig. 4 is a similar view of one of the fastening members thereof.

Referring to the drawing, the numeral 1 designates the stay member and 2 the fastening members of the device. The stay member comprises an elongated body portion 2' which may be plain or ornamental, as desired, and which is preferably provided with ornamental terminals or heads 3, each of which is formed at diametrically opposite sides with inturned spurs, points or prongs 4. In the present instance, the stay member is illustrated as being formed of sheet metal, its body portion consisting of two parallel strips joined to the end terminals or heads 3, which are of ring form; but any other equivalent construction may be employed. Each fastening member 2 is composed of a single piece of spring wire, nickel-plated or otherwise suitably finished, the wire being bent to provide a substantially V-shaped body portion 5 from the ends of which extend spring locking arms 6, which are inwardly curved or offset to interlock with the prongs of the stay member, as hereinafter described. At the outer ends of the arms 6 the wire of which the fastening member is composed is looped and has its end portions bent reversely or inwardly toward the body portion 5 to provide guard fingers 7, which are longitudinally curved in segmental form to adapt them to extend or overlap the free ends of the prongs on lines inside the offset portions of the arms 6.

In Figs. 1 and 2, I have illustrated one mode of use of the device as a stay for a collar or belt 8 to hold the same spread or stretched out and prevent it from folding or wrinkling in use. A series of the devices arranged at proper intervals around or along the length of a collar or belt may be employed for this purpose, and by reference to Figs. 1 and 2 it will be seen that the stay member is arranged upon the inner side of the collar or belt to extend vertically (transversely) thereof and has its prongs 4 passed through the belt and projecting over upon the outer side of the belt, the fabric being hooked onto the prongs in an obvious manner. The stay as thus applied is secured in position against possible displacement by a pair of the fastening members 2, which are applied on the outer side of the belt, as indicated in Fig. 2, by springing the arms 6 into locking engagement with the bight portions of the prongs 4, which lie in the concavities formed by the offsets, by which the fastener is held from shifting in either direction longitudinally of the stay and also transversely thereof. The looped portions of the arms of the fastener provide grips by which said arms may be sprung inward for engagement and release. The construction and arrangement of the locking arms insures a firm connection, but, in order to obtain additional security, the fingers 7 are provided and overlie the prongs to prevent any tendency of the fastening member being forced out of engagement with the prongs under strain during the use of the garment. The device may also be used for connecting the meeting ends of collars, belts and other like articles of dress, in which event the stay member is arranged on the inner side of the inner meeting edge and both meeting edges hooked over the prongs which are thereby passed therethrough, after which the fastening members are exteriorly applied, as above described, and the collar may be secured to the band of the waist by additional stays and fastening devices or in any of the customary ways. The device is also susceptible of other uses and provides an article of convenience which is readily applicable to and removable from the garment at will and forms an ornamental adjunct.

Having thus fully described the invention, what is claimed as new is:—

1. A device of the character described comprising a stay member having prongs, and a fastening member having relatively movable spring arms to interlock with the prongs.

2. A device of the character described comprising a stay member having prongs, and a fastening member having inwardly off-set spring arms to interlock with the prongs.

3. A device of the character described comprising a stay member having inwardly bendable prongs, and a fastening member formed of a single piece of wire bent to provide a body portion having spring arms extending therefrom and off-set to interlock with the prongs, the free ends of the wire being looped to provide spring guard fingers adapted to bear upon the outer faces of the prongs on lines inside the off-set portions of the arms.

4. A device of the character described comprising a stay member provided at each end with a pair of prongs, and fastenings having arms adapted to interlock with the prongs and spring-fingers.

5. A device of the character described comprising a stay member provided with a pair of spaced prongs, and wire fastening members having inwardly offset arms adapted to interlock with the prongs and spring guard fingers adapted to overlie the prongs.

6. A device of the character described comprising a member having prongs adapted to pass through a garment or other object and bent inwardly toward each other, and a fastening member formed of wire and having inwardly offset arms adapted to lie beneath and interlock with said prongs, said arms terminating in spring fingers adapted to bear upon the outer faces of the prongs.

In testimony whereof, I affix my signature in presence of two witnesses.

LUCY W. FARRIS.

Witnesses:
JOHN A. BARNES,
BETTIE J. SHOUP.